Oct. 13, 1925.
J. B. REYNOLDS
1,557,330
FLUID BRAKING APPARATUS
Filed April 17, 1924  2 Sheets-Sheet 1
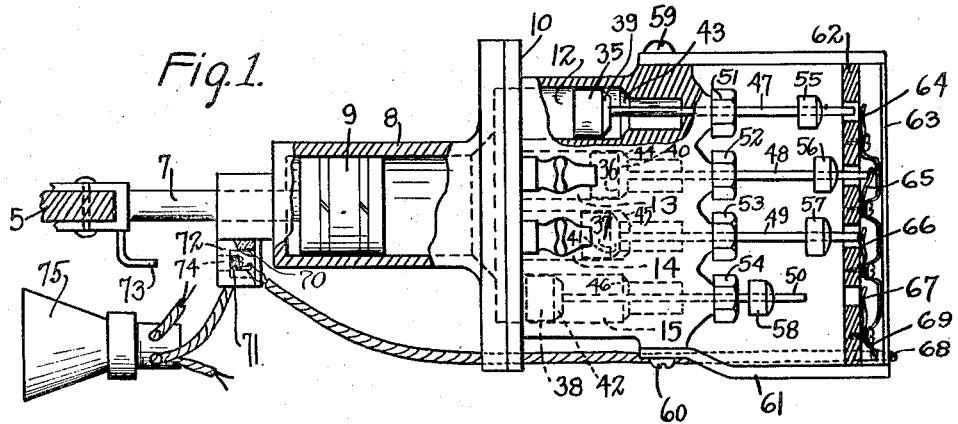
Fig. 1.
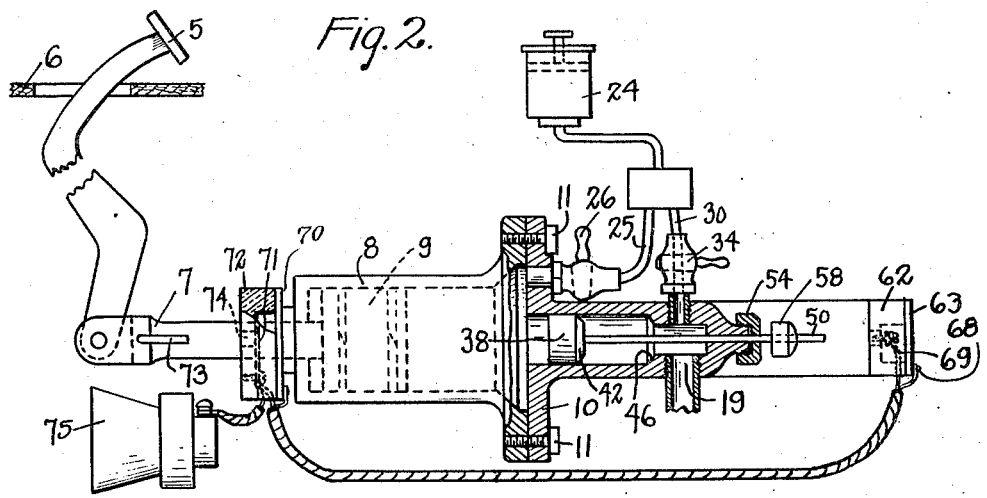
Fig. 2.
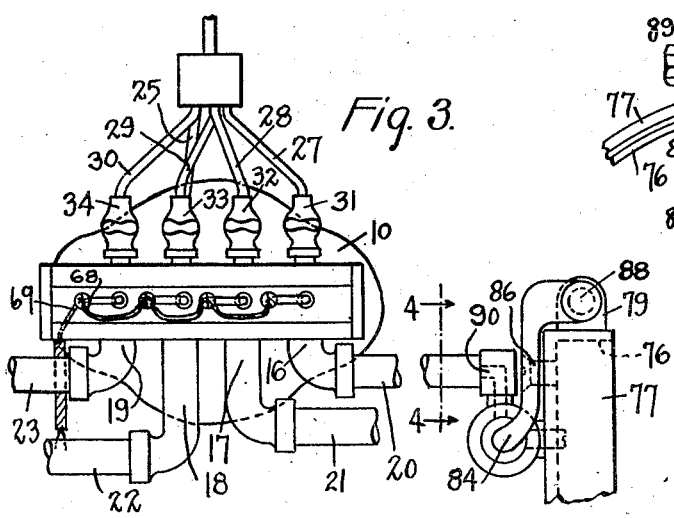
Fig. 3.
Fig. 4.
INVENTOR
JOSEPH B. REYNOLDS
BY Philip C. Kick
ATTORNEY Oct. 13, 1925.  
J. B. REYNOLDS  
FLUID BRAKING APPARATUS  
Filed April 17, 1924

INVENTOR  
JOSEPH B. REYNOLDS  
BY Philip B. Peck  
ATTORNEY

Patented Oct. 13, 1925.

1,557,330

UNITED STATES PATENT OFFICE.

JOSEPH B. REYNOLDS, OF CROTON FALLS, NEW YORK.

FLUID BRAKING APPARATUS.

Application filed April 17, 1924. Serial No. 707,064.

*To all whom it may concern:*

Be it known that I, JOSEPH B. REYNOLDS, a citizen of the United States, and a resident of Croton Falls, in the county of Westchester and State of New York, have invented certain new and useful Improvements in Fluid Braking Apparatus, of which the following is a specification, reference being made to the accompanying drawings, forming a part thereof.

My invention relates particularly to fluid pressure braking apparatus for motor vehicles and the like, and my improvements especially comprise a simple and efficient means for actuating a series of brakes connected with the wheels through the medium of fluid pressure instead of a train of mechanical links and levers.

The objects of my invention are, among other things, to provide an improved fluid brake applying mechanism of this character having a plurality of cylinders connected with a like plurality of brakes operated and controlled by a common or main actuating mechanism for the several cylinder pistons along with separate control valves interposed between the pistons and fluid pressure operated devices associated with the several brake bands. Such mechanism is also coupled with a thereby operated indicating device which simultaneously discloses to the driver the existence of a leaky or punctured pipe connection or conduit leading from any of the particular cylinders connected to its brake, when the outlet from the cylinder to such damaged pipe has been closed by the particular control valve connected with such pipe, which valve will also prevent further loss of the actuating fluid through the pipe.

One of the chief features of my improvement lies in providing means whereby each brake acts independently of the others, yet the pressure through the actuating fluid is perfectly equalized throughout the entire apparatus.

Other objects and advantages attained by my invention will be hereinafter set forth in the following description taken in conjunction with the accompanying drawings in which—

Fig. 1 is a top plan view of my improved braking apparatus in a preferred form as applied to the front and rear wheels of an automobile;

Fig. 2 is a side elevation view partly in section;

Fig. 3 is a rear end view showing a part of the brake actuating apparatus in side elevation;

Fig. 4 is a section taken on the line 4—4 of Fig. 3.

Similar numerals refer to similar parts throughout the several figures.

Figure 5:
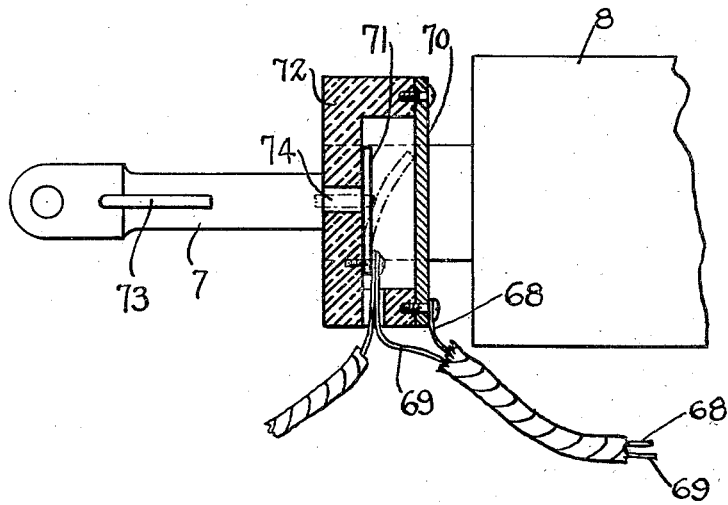
Fig. 5 is an enlarged view of the left end of the braking apparatus as shown in Fig. 2, a part thereof being shown in cross-section.

Referring to the drawings which illustrate my improved fluid braking apparatus in its preferred embodiment so built that the brakes on the front and rear wheels may be applied simultaneously by a common operating element, the foot lever 5 projects through the flooring 6 and is pivotally mounted so that the lever 5 may be readily actuated by the driver. Pinned to the lever 5 is the piston rod 7 extended into the main compression cylinder 8 having the piston 9 slidably reciprocated therein. The compressor 8 is mounted on the casing 10 by screw bolts 11 (Fig. 2), the casing 10 containing a plurality (in this instance four) of like braking cylinders 12, 13, 14 and 15, preferably integrally formed in the casing 10, which cylinders have outlets 16, 17, 18 and 19 respectively connected by pipe connections or conduits 20, 21, 22 and 23 with the separate brakes on the four front and rear wheels of the motor vehicle, only one being shown in Figs. 3 and 4.

Any suitable liquid, such as glycerine, or other fluid, is supplied to the compression cylinder 8 from the reserve tank 24 through pipe 25 having cock 26 as shown in Fig. 2. Each of the braking cylinders 12, 13, 14 and 15 is likewise filled with liquid, preferably from the tank 24, through pipes 27, 28, 29 and 30 respectively leading to the outlets 16, 17, 18 and 19 respectively, such pipes having cocks 31, 32, 33 and 34 to control the supply of liquid to each braking cylinder as will be readily understood.

Sliding in the braking cylinders 12, 13, 14 and 15 are the pistons 35, 36, 37 and 38 respectively, their right-hand ends being beveled to form valves 39, 40, 41 and 42 adapted to seat on the valve-seats 43, 44, 45 and 46 respectively of the cylinders 12, 13, 14 and 15, as shown in Fig. 1. The pistons 35, 36, 37 and 38 each have the rods 47, 48, 49 and 50 secured thereto and extending through the nipples 51, 52, 53 and 54 screw-threaded to the ends of the cylinders 12, 13, 14 and 15 respectively as shown in Figs. 1 and 2. The rods 47, 48, 49 and 50 each have affixed thereto suitable indicating collars 55, 56, 57 and 58 which may be set on the rods 47, 48, 49 and 50 in any predetermined position.

Figure 6:
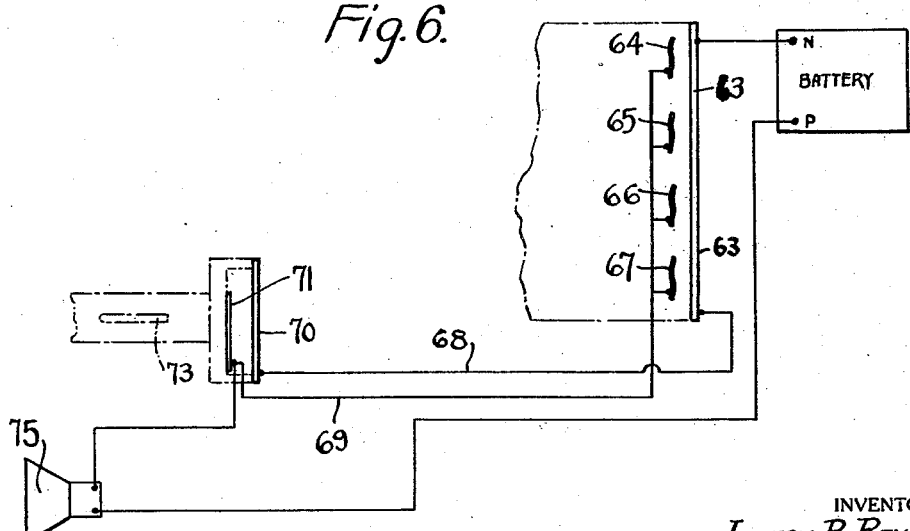
Fig. 6 is a wiring diagram showing the complete electrical circuits from the battery.

Any suitable form of safety device may be coupled with my apparatus to warn the driver that one or more of the fluid brakes is not operating through loss of fluid by a leaky or damaged pipe. In the present embodiment I have shown an electrically-operated mechanism connected with the vehicle horn: Attached to the casing 10 by screws 59 and 60 is the bracket 61 having cross-bar 62 upon which is suitably secured the electrical contact plate 63; also secured to the plate 62 are four spring contacts 64, 65, 66 and 67 (Figs. 1 and 3) which are normally out of contact with the contact-plate 63, but which are adapted to be forced to the right (Fig. 1) into contact with the plate 63 to close an electric circuit when any of the tips of the rods 47, 48, 49 and 50 passing through suitable openings in the bar 62 is moved to the right by a like movement of any of the pistons 35, 36, 37 and 38. The wire 68 is connected with the contact plate 63 and the wire 69 is suitably connected with the contacts, 64, 65, 66 and 67, both wires then passing to the contact 70 and contact 71 respectively mounted in the fibre block 72 secured to the cylinder 8. The piston rod 7 carries the finger 73 which will pass through the opening 74 in the block 72 to force the contact 71 to the right in any abnormal movement of the piston 9 in the same direction from a loss of fluid in the compressor cylinder 8. The horn 75 having the usual connections to the battery and operating button is connected with these open circuits in the usual manner as shown in Fig. 6 to be sounded when any of these circuits is closed by abnormal movements of the piston 9 or valves 39, 40, 41 or 42.

Referring to Figs. 3 and 4, the usual brake drum 76 is fastened to each of the vehicle wheels (only one being shown), with the surrounding brake band 77 having its ends 78 and 79 normally separated by the compression spring 80 as shown in Fig. 4. The brake band 77 is adapted to be drawn into braking relation with the drum 76 by the following fluid pressure mechanism: Within the cylinder 81 are the reciprocable pistons 82 and 83 normally spaced from each other as shown in Fig. 4. Bearing against the outer surfaces of the pistons 82 and 83 are the levers 84 and 85 respectively fulcrumed at 86 and 87 with their upper arms 88 and 89 bolted to the brake band ends 78 and 79 (Fig. 4). The cylinder 81 is connected by pipe 90 to the conduit 20 as shown in Figs. 3 and 4. When pressure is applied through the fluid in the conduit 20 and pipe 90, the piston 82 and 83 separate thereby drawing up the slack in the brake band 77 and applying same in braking relation to the drum 76 while compressing the spring 80. When the fluid pressure is relieved the spring 80 expands to separate the band ends 78 and 79, which thereby actuates the levers 84 and 85 to restore the pistons 82 and 83 to their normal inoperative position as shown in Fig. 4.

The operation of my braking apparatus is substantially as follows: When the compressor cylinder 8 and braking cylinders 12, 13, 14 and 15 with their connecting conduits 20, 21, 22 and 23 are entirely filled with fluid, the operation of the foot-lever 5 in the usual manner moves the piston 9 to the right (Figs. 1 and 2) thereby forcing each of the pistons 35, 36, 37 and 38 to the right, say to the position shown by the pistons 35 and 36 with the valves 39 and 41 not seated. Such simultaneous movement in the braking cylinders causes the brake bands 77 to grip and brake the drum 76 as has been described. Should any leak occur in any of the conduits 20, 21, 22 or 23 or loss of fluid in any of the separate pressure lines connected with any of the brakes, the pistons in the braking cylinders 12, 13, 14 and 15 (as piston 36 in cylinder 13 is shown in Fig. 1) would close the particular outlet 16, 17, 18 or 19 whereby the rods 47, 48, 49 and 50 would immediately close their respective contacts (as rod 48 has forced contact 65 against plate 63 as shown in Fig. 1), which would sound the horn 75 to warn the driver that the braking apparatus is not operating properly. In like manner should any loss of fluid occur in the compressor 8, a similar warning will be sounded from the horn 75. The collars 55, 56, 57 and 58 serve to show the driver which one of the brakes is at fault in that such collar will remain in the most extended position from the nipples on the cylinders 12, 13, 14 and 15. To compensate for any loss of fluid from the apparatus the driver can replenish either the compressor 8 or any of the braking cylinders 12, 13, 14 and 15 from the reserve tank 24 as required. In case of a slow leak in any of the particular systems the particular valve with its indicating collar will approach nearer its contacts every time the brakes are applied, and eventually the circuit will be closed to give the warning and showing of shortage of fluid in the particular pressure line having a leak.

It will be observed that the foregoing construction comprises a fluid braking apparatus that is capable of efficiently performing the braking functions with an equalized pressure by operating the foot-lever 5, yet embodies a safety and indicating mechanism independently operated for each of the plurality of brakes as well as the main compresseor should any leaks occur.

I claim as my invention:

1. In a fluid braking apparatus, separate cylinders connected with separate fluid pressure brakes, pistons in said cylinders having rods extending outside said cylinders, indicators carried by said rods, and check valves on said pistons to independently interrupt the connection between said cylinders and brakes when the pressure in any of the brakes is below a predetermined point.

2. In a fluid braking apparatus, a fluid pressure brake, a fluid compressor, a conduit between said compressor and said brake, an indicator mechanism, and means interposed in said conduit for closing same and actuating said indicator mechanism when the pressure in said brake is below a predetermined point.

3. In a fluid braking apparatus, a fluid pressure brake, a fluid compressor, a conduit between said compressor and said brake, an indicator mechanism, and means interposed in said conduit for closing same and simultaneously actuating said indicator mechanism when the pressure in said brake is below a predetermined point.

4. In a fluid braking apparatus, a fluid pressure brake, a fluid compressor, a conduit between said compressor and said brake, an electrically-operated indicator mechanism, and means interposed in said conduit for closing same and actuating said indicator mechanism when the pressure in said brake is below a predetermined point.

5. In a fluid braking apparatus, a fluid pressure brake, a fluid compressor, a conduit between said compressor and said brake, an electrically-operated sounding device, and means interposed in said conduit for closing same and actuating said sounding device when the pressure in said brake is below a predetermined point.

6. In a fluid braking apparatus, a fluid pressure brake, a fluid compressor, a conduit between said compressor and said brake, an electrically-operated sounding device, and means interposed in said conduit for automatically closing same and simultaneously actuating said sounding device when the pressure in said brake is below a predetermined point.

7. In a fluid brake apparatus, separate cylinders connected with separate fluid pressure brakes, check valves in said cylinders for independently interrupting the connection between any of said cylinders and its brake, an indicating mechanism, and means carried by said valves to actuate said mechanism when the pressure in any of the brakes is below a predetermined point.

8. In a fluid brake apparatus, separate cylinders connected with separate fluid pressure brakes, check valves in said cylinders for independently interrupting the connection between any of said cylinders and its brake, an indicating mechanism, means carried by said valves to actuate said mechanism, when the pressure in any of the brakes is below a predetermined point, and a separate exposed collar slidably mounted on said means for each of said valves.

JOSEPH B. REYNOLDS.